United States Patent Office 2,819,247
Patented Jan. 7, 1958

2,819,247

FLAME-RESISTANT POLYESTER RESINOUS COMPOSITIONS CONTAINING COMBINED HALOGENS AND PHOSPORUS AND PROCESS OF PREPARATION

Lennart A. Lundberg, Stamford, Conn., assignor to American Cyanamid Company, New York, N. Y., a corporation of Maine No Drawing. Application June 10, 1953
Serial No. 360,839

37 Claims. (Cl. 260—45.4)

This invention relates to a clear flame-resistant, self-extinguishing resinous composition. More particularly, this invention relates to a light-stable, flame-resistant, self-extinguishing resinous composition. Further, this invention relates to a light-stable, flame-resistant, self-extinguishing resinous composition, their method of production and products produced therefrom.

The production of flame-resistant resinous compositions is desired inasmuch as said compositions find many uses, as for example in molded and laminated articles. Because resinous compositions also find many uses in certain instances where other materials cannot be used, it is readily apparent that a flame-resistant resinous composition would find immediate employment in the art. Since resinous compositions are primarily hydrocarbon materials, they are often readily flammable. Therefore many attempts have been made to produce stable resinous compositions that are flame resistant.

I have found that by reacting certain chlorine and phosphorus containing compounds, as will be discussed more fully below, that a flame-resistant resinous composition may be produced. It is also desired in certain instances to obtain a light-stable resinous material. Obviously, when the material is employed in an internal or hidden portion of an article, it is not required that the material be light-stable. However, when the material finds use as for example in transparent and translucent application, it is desired that the material be water-clear when produced and also that the material retain this clearness after prolonged exposure to sunlight. I have found that the flame-resistant, self-extinguishing resinous compositions of my invention may be rendered light-stable by the addition thereto of a small amount of a compound having the general formula

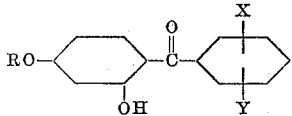

where R is an alkyl group having between 1 and 4 carbon atoms, X is an alkyl group containing between 1 and 4 carbon atoms or an alkoxy group containing between 1 and 4 carbon atoms, hydrogen or halogen groups, and Y is an alkyl group containing between 1 and 4 carbon atoms or an alkoxy group containing between 1 and 4 carbon atoms or hydrogen or halogen group or a hydroxyl group.

The resinous compositions prepared in accordance with my invention are polymerizable unsaturated polyester resinous materials. Further, the resinous compositions prepared in accordance with my invention are polymerizable unsaturated resinous materials which are copolymerizable with a compound containing a polymerizable $CH_2=C<$ group and having a boiling point of at least 60° C.

It is an object of my invention to produce a clear flame-resistant, self-extinguishing polyester resinous composition. It is a further object of my invention to produce a light-stable, flame-resistant unsaturated polyester resinous composition that may be polymerized with a compound containing a polymerizable $CH_2=C<$ group. These and other objects of my invention will be discussed more fully hereinbelow.

As is well known in the art, conventional polymerizable unsaturated polyester resins, such as those prepared by reacting an ethylenically unsaturated polycarboxylic acid with a polyhydric aliphatic alcohol in admixture with a polymerizable compound containing a polymerizable $CH_2=C<$ group, are extremely useful as resinous compositions, particularly in the field of molding, casting and laminating. These compositions, generally speaking, are not fire-resistant as such. In order to obtain a fire-resistant material, it has been necessary to introduce physically other compounds into the composition. Admixing the materials was inconvenient and the composition produced was ineffective in developing a stable fire-resistant material. These materials were also subject to developing marked yellowing when exposed to sunlight, which is undesirable when a water-clear article is desired. By the process of my invention it is thus possible to obtain not only a flame-resistant, self-extinguishing polyester resinous composition but when desired also a composition that is light-stable and does not yellow when exposed to sunlight.

In the preparation of the polymerizable unsaturated polyester resinous compositions of my invention, one may make use of the ethylenically unsaturated polycarboxylic acids such as maleic, fumaric, aconitic, itaconic, and the like. The ethylenically unsaturated polycarboxylic acids include those known as the alpha, beta unsaturated acids. These unsaturated acids should be present in an amount approximating at least 20% by weight of the total weight of the polycarboxylic acids used and preferably in amounts varying between about 25% and 65% by weight based on the total weight of polycarboxylic acid present. If it is desired to make use of saturated polycarboxylic acids, i. e., those which are free of non-benzenoid unsaturation, one could use such acids as phthalic, malonic, succinic, glutaric, sebacic, and the like, but in amounts less than a larger proportion of the total amount of polycarboxylic acid present. Whenever available, the anhydrides of these acids may be used, e. g., maleic anhydride, phthalic anhydride, and as used herein polycarboxylic acids include the polycarboxylic anhydrides when available. Also, mixtures of the acids and anhydrides may be used in the preparation of the polyester resin.

As polyhydric alcohols which may be used in the preparation of the polymerizable unsaturated polyesters of the present invention, it is preferred that those alcohols containing only two hydroxy groups be used. However, those alcohols containing three hydroxy groups, four hydroxy groups, or more hydroxy groups may be used in minor amounts. Illustrative examples of the various dihydroxy alcohols that find employment in my invention are: ethylene glycol, diethylene glycol, propylene glycol, dipropylene glycol, butanediol-1,4, butanediol-1,3, butanediol-1,2, pentanediol-1,4, pentanediol-1,5, hexanediol-1,6, and the like. Additionally, such polyhydric alcohols as glycerol, pentaerythritol, dipentaerythritol and the like may be used in my invention.

In the preparation of the polymerizable unsaturated polyesters, one may use the polyhydric alcohols and the polycarboxylic acids in a proportion substantially equally about mol for mol and preferably an excess of alcohol approximating 15% above the stoichiometric quantity required for complete esterification. If polyhydric alcohols containing more than two hydroxy groups are used, calculation of the molar proportion should be made on a stoichiometric basis so as to make allowance for the additional hydroxy groups such as those found in glycerol, pentaerythritol and the like. This is also true when polycarboxylic acids having more than two carboxyl groups are employed. A sufficient quantity of the alcohol and acid should be reacted so as to produce an ultimate polyester resinous material having an acid number not greater than about 55 and not lower than about 20 and, preferably, an acid number from about 35 to 40. The polymerizable unsaturated polyesters are admixed with a monomeric compound containing the polymerizable $CH_2=C<$ group to give a composition that may be cured to a stable thermoset condition. One may use about 10 parts by weight of the monomeric material to about 90 parts of the unsaturated polyester resin up to about 50 parts of the monomeric material to about 50 parts of the polymerizable unsaturated polyester resin. The preferred embodiment, however, is to use from about 25 parts of the monomeric material to about 35 parts of the monomeric material with about 75 parts to about 65 parts, respectively, of the polymerizable unsaturated polyester resin.

The monomeric material containing the polymerizable $CH_2=C<$ group has a boiling point of at least 60° C. Among the polymerizable monomeric materials that may find use in my invention are such as styrene, side-chain alkyl and halo substituted styrenes such as alpha methylstyrene, alpha chlorostyrene, alpha ethylstyrene and the like or alkyl and halo ring-substituted styrene such as ortho, meta and paraalkyl styrenes such as o-methylstyrene, p-ethylstyrene, meta-propylstyrene, 2,4-dimethylstyrene, 2,5-diethylstyrene, bromostyrene, chlorostyrene, dichlorostyrene, and the like. Still further, one can make use of the allyl compounds such as diallyl phthalate, tetrachlorodiallyl phthalate, allyl alcohol, methallyl alcohol, allyl acetate, allyl methacrylate, diallyl carbonate, allyl lactate, allyl alpha-hydroxyisobutyrate, allyl trichlorosilane, allyl acrylate, diallyl malonate, diallyl oxalate, diallyl gluconate, diallyl methylgluconate, diallyl adipate, diallyl sebacate, diallyl citraconate, the diallyl ester of muconic acid, diallyl itaconate, diallyl chlorophthalate, diallyl dichlorosilane, the diallyl ester of endomethylene tetrahydrophthalic anhydride, the diallyl ester of tetrachloro endomethylene tetrahydrophthalic anhydride, triallyl tricarballylate, triallyl aconitate, triallyl cyanurate, triallyl citrate, triallyl phosphate, trimethallyl phosphate, tetraallyl silane, tetraallyl silicate, hexallyl disiloxane, and the like.

While I have set forth the above preparation of the polymerizable unsaturated polyester resin in accordance with the process as known in the prior art, an essential feature of my invention is that either or both of the polycarboxylic acids and polyhydric alcohols utilized be halogenated with a halogen having an atomic weight greater than 35. The preparation of the polymerizable unsaturated polyester resins utilizing halogenated polycarboxylic acids and polyhydric alcohols is carried out exactly as if the reactants were unhalogenated. It is not necessary that all of the reactants in the preparation of the polyester resins be halogenated but only that a sufficient amount of the reactants be halogenated so that the polyester resins contain from about 5% to about 50% by weight of combined halogen. The halogens that find use in my invention are chlorine, bromine and iodine. It is preferred that the halogen content of the polyester resin be from about 25% to about 35% by weight. In order to obtain this halogen content in the polyester resin, one may employ as the reactants all halogenated compounds or some compounds which are halogenated. Illustrative examples of halogenated polyhydric alcohols that may be used in my invention are: 3,4-dibromo-3-chloro-1,2-butanediol; 2,3-dibromo-1,4-butanediol; 1,4-dichloro-2,3-butanediol; 1,4-diiodo-2,3-butanediol; 5-chloro-1,2-pentanediol; 1,5,5,5-tetrachloro-1,3-pentanediol; 2-chloro-1,5-pentanediol and the like.

Illustrative examples of halogenated polycarboxylic acids and anhydrides thereof that may be used in my invention are: bromo-fumaric acid; chloro-fumaric acid; bromo-maleic acid; chloro-maleic acid; dibromo-maleic acid; chloro-maleic anhydride; dibromo-maleic anhydride; dichloro-maleic anhydride; bromo-malonic acid; chloromalonic acid; dibromo-malonic acid; bromo-succinic acid; alpha,beta-dibromo-succinic acid; alpha,beta-diiodo-succinic acid; alpha,beta-dichloro-succinic acid; alpha,beta-dichloro-succinic anhydride; 3-bromo-phthalic acid; 4-chloro-phthalic acid; 3,4-dibromo-phthalic acid; 3,6-dichloro-phthalic acid; tetrachloro-phthalic acid; 3-bromophthalic anhydride; 4-chloro-phthalic anhydride; 3,6-dibromo-phthalic anhydride; 3,6-dichloro-phthalic anhydride; 4,5-dichloro-phthalic anhydride; tetrachloro-phthalic anhydride; dibromo-sebacic acid; hexachloroendomethylene tetrahydro-phthalic acid and the like.

An essential feature of my invention is coreacting certain alkyl phosphates with the polycarboxylic acid and polyhydric alcohol during the preparation of the polymerizable unsaturated polyester resin. When phosphorus compounds were employed in the prior art, said phosphorus containing materials were introduced into the polyester resin after the latter had been produced. They were only present as a physical admixture. This fact is shown by loss in weight of the material when subjected to prolonged elevated temperatures, thus causing a loss in weight. The alkyl phosphates that are employed in the present invention are coreacted in the preparation of the polyester resin and are chemically combined therein. When the resinous materials of my invention are subjected to prolonged exposure to elevated temperatures, there is no significant weight loss as is experienced in the prior art. Examples of the alkyl phosphates that may be utilized in the process of my invention are those in which the alkyl group contains from 1 to 4 carbon atoms. Illustrative examples of such compounds are triethyl phosphate, diethyl phosphate, monoethyl phosphate, and the like. The alkyl group has been set forth as the ethyl radical, but it will be understood that the alkyl group may be such as methyl, propyl, butyl, isopropyl, isobutyl, tertiarybutyl, and the like. The amount of alkyl phosphate reacted is such that the polyester contains from about 0.1% to about 5% of combined phosphorus, preferably from about 0.5% to about 1.5% by weight based on the total weight.

When it is desired to produce a light-stable, flame-resistant polyester resinous composition, from about 0.01% to about 5% by weight of a compound represented by the general formula

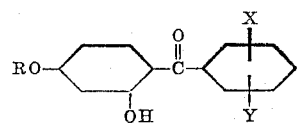

where R is an alkyl group having between 1 and 4 carbon atoms, X is an alkyl group containing between 1 and 4 carbon atoms of an alkoxy group containing between 1 and 4 carbon atoms, hydrogen or halogen group, and Y is an alkyl group containing between 1 and 4 carbon atoms or an alkoxy group containing between 1 and 4 carbon atoms or hydrogen or a halogen group or a hydroxyl group based on the total weight of the polyester resin solids and the weight of the monomeric material containing the polymerizable $CH_2=C<$ group may be added. It is preferred, however, that from about 0.1% to about 1% by weight of the compound represented by the general formula set forth above be employed. Illustrative examples of compounds represented by the general formula are such as 2,2'-dihydroxy, 4,4'-dimethoxy benzophenone; 2,2'dihydroxy, 4,4'diethoxy benzophenone; 2,2'dihydroxy, 4,4'dibutoxy benzophenone; 2,2'dihydroxy, 4 methoxy, 4'ethoxy benzopheone; 2,2'dihydroxy, 4 methoxy, 4'propoxy benzophenone; 2,2'dihydroxy, 4 methoxy, 4' butoxy benzophenone; 2,2' dihydroxy, 4 ethoxy 4'propoxy benzophenone; 2,2'dihydroxy, 4 ethoxy, 4'butoxy benzophenone; 2,3'dihydroxy, 4,4'dimethoxy benzophenone; 2,3'dihydroxy, 4 methoxy, 4'butoxy benzophenone; 2 hydroxy, 4,4'5'trimethoxy benzophenone; 2 hydroxy, 4,4'6'tributoxy benzophenone; 2 hydroxy, 4 butoxy, 4,5'dimethoxy benzophenone; 2 hydroxy, 4 ethoxy, 2',4'dibutyl benzophenone; 2 hydroxy, 4 propoxy, 4'6'dichloro benzophenone; 2 hydroxy, 4 propoxy, 4',6'dibromo benzophenone. It can be further appreciated that in the place of the chloro or bromo groups in any of the above-identified compounds, one may readily substitute an iodo group or a fluoro group.

Additional light-stabilizing compounds which may be employed in the polymerizable unsaturated polyester resinous composition of my invention are 2-hydroxy-4-methoxybenzophenone, 2-hydroxy - 4 - ethoxybenzophenone, 2 - hydroxy - 4 - propoxybenzophenone, 2 - hydroxy - 4 - butoxybenzophenone, 2 - hydroxy - 4-methoxy-4'-methylbenzophenone, 2-hydroxy-4-methoxy-4'-ethylbenzophenone, 2-hydroxy-4-methoxy-4' - propylbenzophenone, 2-hydroxy-4-methoxy - 4'-butylbenzophenone, 2-hydroxy-4-methoxy-4'-chlorobenzophenone, 2-hydroxy-4-methoxy-4'-bromo - benzophenone, 2 - hydroxy-4,4'-dimethoxybenzophenone, 2-hydroxy-4,4'-dimethoxy-3-methylbenzophenone, 2-hydroxy-4,4' - dimethoxy - 2'-ethylbenzophenone, 2-hydroxy-4,4'-5'-trimethoxybenzophenone, 2-hydroxy-4-ethoxy-4'-methylbenzophenone, 2-hydroxy-4-ethoxy - 4' - ethylbenzophenone, 2-hydroxy-4-ethoxy-4'-propylbenzophenone, 2 - hydroxy-4-ethoxy-4'-butylbenzophenone, 2-hydroxy-4-ethoxy-4'-methoxybenzophenone, 2-hydroxy-4,4'-diethoxybenzophenone, 2-hydroxy-4-ethoxy-4'-propoxybenzophenone, 2 - hydroxy-4-ethoxy-4'-butoxybenzophenone, 2-hydroxy-4-ethoxy - 4'-chlorobenzophenone, 2-hydroxy-4-ethoxy-4'-bromobenzophenone, and the like. From this illustration of compounds which are representative of the class which may be used in the invention in the present application, there may be used as substituents in the 2', 3', 4', 5' and 6' position, either methyl, ethyl, propyl, or butyl, or methoxy, ethoxy, propoxy, or butoxy, or any of the halo groups, namely, chloro, bromo, iodo, or fluoro, or they may be unsubstituted, such as by having a hydrogen atom in each of those positions. Additionally, one may have as a substituent in the 2', 3', 4', 5' or 6' position in addition to any of the substituents mentioned hereinabove in any given position a further substituent in an alternate position in the secondary ring. These additional substituents may be methyl, ethyl, propyl, butyl or methoxy, ethoxy, propoxy, butoxy, or any of the halo groups mentioned above or hydrogen.

In the formulation of the resinous composition of my invention, it is necessary that a catalyst be present to effect the polymerization of the unsaturated polyester resin and the monomeric material containing the polymerizable $CH_2=C<$ group. It is preferred, as is well known in the art, that a catalyst of the peroxide class be utilized. The amount of the catalyst may vary over rather wide limits, depending upon the desired rate of polymerization of the material. Thus, from about 0.1% to about 10% by weight based on the total weight of the polymerizable composition may be used. Preferably, from about 0.5% to about 1% by weight of the catalyst based on the total weight of the polymerizable resinous composition gives the desired results. It is obvious that other proportions of the catalyst may be utilized when a faster or slower rate of cure is desired. Examples of the organic peroxide catalyst that may be used in my invention are such as benzoyl peroxide, succinyl peroxide, acetyl peroxide, perbenzoic acid, peracetic acid, anisoyl peroxide, toluyl peroxide, p-bromobenzoyl peroxide, furoyl peroxide and chloracetyl peroxide or any organic ozonide, such as diisopropylene ozonide, diisobutylene ozonide, or a mixture of such substances, may be used as the curing catalyst.

If it is desired to effect low temperature cure of the unsaturated polyester resinous composition, it will be desirable to make use of a material commonly referred to as a promoter. These promoters, such as the mercaptans, the alkyl substituted anilines and the metallic salt driers, e. g., cobalt naphthenate, are generally dispersed in a solution of a suitable solvent material, such as the monomeric polymerizable material. If high temperature cure is to be accomplished, a promoter is not necessary. Promoters which are useful in this connection have been disclosed in prior art as represented by such patents as U. S. 2,466,800 and 2,480,928.

In order to control the rate of polymerization during the cure of the resinous composition of my invention, it is advantageous to add a moderate amount of an inhibiting agent to the resinous composition. The amount of inhibiting agent used is that required to give the desired degree of inhibiting effect. Examples of inhibiting agents that may be used in my invention are hydroquinone, pyrogallol and tannic acid, or an aromatic amine such as aniline or phenylene diamine. Mixtures of the inhibiting agents may also be used if desired. About 0.008% of inhibiting agent by weight based on the total weight of the resinous composition usually gives satisfactory results.

In order to illustrate the fire-resistant properties of the resinous composition of my invention, various standard fire-resistance tests were carried out. In order to show the self-extinguishing properties of the material, the following Standard Underwriters Test was carried out. The specifications of this test call for a 1 x 9" glass-filled laminate to be exposed to a 5" flame from a Bunsen burner, the tip of the inner flame being 1 inch long. The flame is exposed at an angle of 45° to the laminate one inch from its bottom for 30 seconds. The flame is then removed and the time required for the material to extinguish itself is recorded. The material must extinguish itself in 20 seconds to be acceptable. The standard burning rate as set forth by the specifications of ASTM D757–49 was also carried out. The specifications for this test are:

An igniting bar is heated to 950° C. by alternating or direct current, the electrical input of which is adjusted to 350±20 watts. A test specimen 5 x ½ x ⅛ inches is clamped in a holder with its length horizontal and at right angle to the axis of the igniting bar and its width in a vertical plane. The length of the specimen free to burn is 4 inches. The front end of the specimen is brought into contact with the igniting bar and allowed to remain in this position for 3 minutes. After 3 minutes any flaming shall be extinguished, the specimen removed, and the length burned measured. The length burned divided by 3 then gives the burning rate in inches per minute.

The self-extinguishing test as set forth in the ASTM specifications D635–44 was also carried out. The specifications for this test are:

A test specimen 6 inches in length by 0.5 inch in width and of the thickness of the material as normally used is clamped in a support with its longitudinal axis horizontal and its traverse axis inclined at 45° to the horizontal. A Bunsen burner with a flame ½ to ¾ inch in height is placed under the free end of the specimen and adjusted so that the flame tip is just in contact therewith. At the end of 30 seconds the flame is removed and the specimen allowed to burn. A stop watch is started when the flame reaches the first mark, 1 inch from the end, and the time noted when the flame reaches the 5 inch mark. In case the specimen does not continue to burn after the first ignition, the burner is placed under the free end for a second period of 30 seconds immediately following the extinction of the flame. If the specimen does not continue to burn to the 5 inch mark after the second ignition, it is reported as self-extinguishing.

In order that those skilled in the art may more fully understand the inventive concept herein disclosed, the following examples are given by way of illustration and not limitation unless otherwise noted in the appended claims. All parts are parts by weight.

Example 1

470 parts of maleic anhydride, 935 parts of hexachloroendomethylenetetrahydrophthalic acid, 490 parts of ethylene glycol and 113.9 parts of triethyl phosphate were charged into a suitable reaction vessel. The reactants were esterified under an inert atmosphere of carbon dioxide and at an elevated temperature until an acid number of 36.3 was obtained. 1799 parts of a polymerizable unsaturated polyester resin was obtained, to which 0.008% by weight of hydroquinone was added, based on the total weight. 694 parts of styrene were then added to the polyester. The viscosity of the resinous composition was about "U" on the Gardner-Holdt scale or about 5.50–6.27 poise. 1% by weight of a 50–50 mixture of benzoyl peroxide and tricresyl phosphate catalyst were added. The gel time for the resinous composition at 80° C. was 19 minutes and 30 seconds. The chlorine content based on the final product was 20%. In order to obtain a light-stable material, 6.24 parts by weight of 2 hydroxy, 4 methoxy-benzophenone based on the total weight was added to the polymerizable mixture.

Example 2

445 parts of maleic anhydride, 1769 parts of hexachloroendomethylene tetrahydrophthalic acid, 617.5 parts of ethylene glycol and 170 parts of triethyl phosphate were reacted at an elevated temperature and under an inert atmosphere to an acid number of 39.6. 2725 parts of the polymerizable unsaturated polyester resin were obtained. To 72 parts of the polyester were added 28 parts of styrene and 0.25% by weight of 2 hydroxy, 4 methoxy-benzophenone. The viscosity of the resinous composition was O-P on the Gardner-Holdt scale. Employing the same proportion of the catalyst used in Example 1 gave the resinous composition a gel time at 80° C. of 20 minutes and 10 seconds. Corrugated glass sheeting was impregnated with the resinous composition and cured under elevated temperatures and pressure. The corrugated glass sheeting was then subjected to a heat-aging test maintained at 150° C. The weight loss after 30 days was 1.06%, thereby illustrating the fact that the chlorine and phosphorus present in the resinous material was chemically combined. The Standard Underwriters' Test outlined above was run on the material and it was found that the laminate extinguishes itself in a period of from 3 to 5 seconds. The time for self-extinction of the material after the thirty-day heat-aging test was also from 3 to 5 seconds. The burning rate test as outlined above was run on the material and it was found that the burning rate was 0.50 inch per minute. A standard polyester resinous material was made by reacting 3 mols of maleic anhydride, 3 mols of phthalic anhydride and 6.6 mols of propylene glycol. To 72 parts of the polyester was added 28 parts of styrene and the resinous composition cured in a manner well known in the art. This material subjected to the burning rate test burned at a rate of 1.05 inches per minute and continued to burn after removal from the flame until entirely consumed.

The light stability of the resinous compositions of my invention compared to the standard polyester resin above prepared is shown in the following table:

| Resin | Amount of light stabilizer, percent by wt. | 200 cycle sunlamp | 2 month Outdoor exposure |
|---|---|---|---|
| Example 2 | 0.25 | Barely noticeable change. | No change. |
| Standard | none | Dark yellow | Dark yellow. |

Example 3

807 parts of maleic anhydride, 1180 parts of tetrachlorophthalic anhydride, 843 parts of ethylene glycol and 170 parts of triethyl phosphate were reacted at an elevated temperature and under an inert atmosphere to obtain 2674 parts of an unsaturated polyester having an acid number of 40.1. To 72 parts of the polyester were added 28 parts of styrene and 0.25% by weight of 2 hydroxy, 4 methoxy-benzophenone based on the total weight of the resinous material. The viscosity of the resinous composition was 36.2 poise and the gel time at 80° C. was 16 minutes and 23 seconds. 3720 parts of the resinous composition were thus obtained.

Each of the resinous compositions prepared in accordance with Examples 1, 2 and 3 were self-extinguishing as defined in the ASTM specification D 635–44. The standard resin which did not contain the chemically combined chlorine and phosphorus was not.

Example 4

297 parts of maleic anhydride, 1180 parts of hexachloroendomethylene tetrahydrophthalic acid, 432.6 parts of ethylene glycol and 78.5 parts of monoethyl phosphate were reacted at an elevated temperature and under an inert atmosphere to obtain an unsaturated polyester having an acid number of 40. A flame resistant self-extinguishing resinous composition was prepared by adding 28 parts of styrene to 72 parts of the polyester produced.

Example 5

297 parts of maleic anhydride, 1180 parts of hexachloroendomethylene tetrahydrophthalic acid, 432.6 parts or ethylene glycol and 105 parts of diethylphosphate were reacted to an acid number of 39.8 under an inert atmosphere and at an elevated temperature. To 65 parts of the polyester were added 35 parts of styrene and 0.25% by weight based on the total weight of 2 hydroxy, 4 methoxy-benzophenone.

Example 6

297 parts of maleic anhydride, 1180 parts of hexachloroendomethylene tetrahydrophthalic acid, 432.6 parts of ethylene glycol and 67.3 parts of ethyl meta phosphate were reacted at an elevated temperature and under an inert atmosphere until an acid number of 40.1 was obtained. 30 parts of styrene were then added to 70 parts of the polyester to give a polymerizable flame resistant composition.

I claim:

1. A clear, flame-resistant, self-extinguishing resinous composition comprising the reaction product of (1) a polymerizable ethylenically unsaturated polyhydric alcohol-polycarboxylic acid-alkyl phosphate polyester obtained as the reaction product of a polyhydric alcohol and an ethylenically unsaturated polycarboxylic acid wherein said polyester contains combined halogen selected from the group consisting of chlorine, bromine and iodine and mixtures thereof in an amount to yield from about 5% to about 50% by weight of said product and an alkyl phosphate wherein the alkyl group contains from 1 to 4 carbon atoms and is present in an amount to yield from about 0.1% to about 5% by weight of said product and (2) a compound containing a polymerizable $CH_2=C<$ group and having a boiling point of at least 60° C.

2. A clear, light-stable flame-resistant self-extinguishing resinous composition comprising the reaction product of (1) a polymerizable ethylenically unsaturated polyhydric alcohol-polycarboxylic acid-alkyl phosphate polyester obtained as the reaction product of a polyhydric alcohol and an ethylenically unsaturated polycarboxylic acid wherein said polyester contains combined halogen selected from the group consisting of chlorine, bromine and iodine and mixtures thereof in an amount to yield from about 5% to about 50% by weight of said product and an alkyl phosphate wherein the alkyl group contains from 1 to 4 carbon atoms and is present in an amount to yield from about 0.1% to about 5% by weight of said product, (2) a compound containing a polymerizable $CH_2=C<$ group and having a boiling point of at least 60° C. and (3) from about 0.01% to about 5% by weight based on the total weight of a compound having the general formula

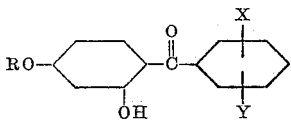

wherein R is an alkyl group having from 1 to 4 carbon atoms, X is a member selected from the group consisting of hydrogen, halo groups, alkyl groups having from 1 to 4 carbon atoms and alkoxy groups having from 1 to 4 carbon atoms and Y is a member selected from the group consisting of hydrogen, hydroxyl groups, halo groups, alkyl groups having from 1 to 4 carbon atoms and alkoxy groups having from 1 to 4 carbon atoms.

3. A clear, light-stable flame-resistant self-extinguishing resinous composition comprising the reaction product of (1) a polymerizable ethylenically unsaturated polyhydric alcohol-polycarboxylic acid-alkyl phosphate polyester obtained as the reaction product of a polyhydric alcohol and an ethylenically unsaturated polycarboxylic acid wherein said polyester contains combined halogen selected from the group consisting of chlorine, bromine and iodine and mixtures thereof in an amount to yield from about 5% to about 50% by weight of said product and an alkyl phosphate wherein the alkyl group contains from 1 to 4 carbon atoms and is present in an amount to yield from about 0.1% to about 5% by weight of said product and (2) a compound containing a polymerizable $CH_2=C<$ group and having a boiling point of at least 60° C. and (3) from about 0.01% to about 5% by weight based on the total weight of 2-hydroxy-4-methoxybenzophenone.

4. A clear, flame-resistant self-extinguishing resinous composition comprising the reaction product of (1) a polymerizable ethylenically unsaturated polyhydric alcohol-polycarboxylic acid-alkyl phosphate polyester obtained as the reaction product of a polyhydric alcohol and an ethylenically unsaturated polycarboxylic acid wherein said polyester contains combined halogen selected from the group consisting of chlorine, bromine and iodine and mixtures thereof in an amount to yield from about 25% to about 35% by weight of said product and an alkyl phosphate wherein the alkyl group contains from 1 to 4 carbon atoms and is present in an amount to yield from about 0.5% to about 1.5% by weight of said product and (2) a compound containing a polymerizable $CH_2=C<$ group and having a boiling point of at least 60° C.

5. A clear-light-stable flame-resistant self-extinguishing resinous composition comprising the reaction product of (1) a polymerizable ethylenically unsaturated polyhydric alcohol-polycarboxylic acid-alkyl phosphate polyester obtained as the reaction product of a polyhydric alcohol and an ethylenically unsaturated polycarboxylic acid wherein said polyester contains combined halogen selected from the group consisting of chlorine, bromine and iodine and mixtures thereof in an amount to yield from about 25% to about 35% by weight of said product and an alkyl phosphate wherein the alkyl group contains from 1 to 4 carbon atoms and is present in an amount to yield from about 0.5% to about 1.5% by weight of said product, (2) a compound containing a polymerizable $CH_2=C<$ group and having a boiling point of at least 60° C. and (3) from about 0.1% to about 1% by weight based on the total weight of a compound having the general formula

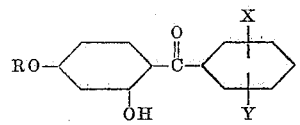

wherein R is an alkyl group having from 1 to 4 carbon atoms, X is a member selected from the group consisting of hydrogen, halo groups, alkyl groups having from 1 to 4 carbon atoms, and alkoxy groups having from 1 to 4 carbon atoms and Y is a member selected from the group consisting of hydrogen, hydroxyl groups, halo groups, alkyl groups having from 1 to 4 carbon atoms and alkoxy groups having from 1 to 4 carbon atoms.

6. A clear, light-stable flame-resistant self-extinguishing resinous composition comprising the reaction product of (1) a polymerizable ethylenically unsaturated polyhydric alcohol-polycarboxylic acid-alkyl phosphate polyester obtained as the reaction product of a polyhydric alcohol and an ethylenically unsaturated polycarboxylic acid wherein said polyester contains combined halogen selected from the group consisting of chlorine, bromine and iodine and mixtures thereof in an amount to yield from about 25% to about 35% by weight of said product and an alkyl phosphate wherein the alkyl group contains from 1 to 4 carbon atoms and is present in an amount to yield from about 0.5% to about 1.5% by weight of said product, (2) a compound containing a polymerizable $CH_2=C<$ group and having a boiling point of at least 60° C and (3) from about 0.1% to about 1% by weight based on the total weight of 2-hydroxy-4-methoxybenzophenone.

7. A clear, flame-resistant self-extinguishing resinous composition comprising the reaction product of (1) a polymerizable ethylenically unsaturated polyhydric alcohol-polycarboxylic acid-alkyl phosphate polyester obtained as the reaction product of a polyhydric alcohol and an ethylenically unsaturated polycarboxylic acid wherein said polyester contains combined halogen selected from the group consisting of chlorine, bromine and iodine and mixtures thereof in an amount to yield from about 25% to about 35% by weight of said product and an alkyl phosphate wherein the alkyl group contains from 1 to 4 carbon atoms and is present in an amount to yield from about 0.5% to about 1.5% by weight of said product and (2) styrene.

8. A clear, light-stable flame-resistant self-extinguishing resinous composition comprising the reaction product of (1) a polymerizable ethylenically unsaturated polyhydric alcohol-polycarboxylic acid-alkyl phosphate polyester obtained as the reaction product of a polyhydric alcohol and an ethylenically unsaturated polycarboxylic acid wherein said polyester contains combined halogen selected from the group consisting of chlorine, bromine and iodine and mixtures thereof in an amount to yield from about 25% to about 35% by weight of said product and an alkyl phosphate wherein the alkyl group contains from 1 to 4 carbon atoms and is present in an amount to yield from about 0.5% to about 1.5% by weight of said product, (2) styrene and (3) from about 0.1% to about 1% by weight based on the total weight of a compound having the general formula

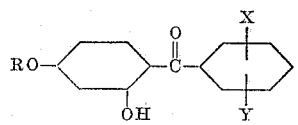

wherein R is an alkyl group having from 1 to 4 carbon atoms, X is a member selected from the group consisting of hydrogen, halo groups, alkyl groups having from 1 to 4 carbon atoms, and alkoxy groups having from 1 to 4 carbon atoms and Y is a member selected from the group consisting of hydrogen, hydroxyl groups, halo groups, alkyl groups having from 1 to 4 carbon atoms and alkoxy groups having from 1 to 4 carbon atoms.

9. A clear, light-stable flame-resistant self-extinguishing resinous composition comprising the reaction product of (1) a polymerizable ethylenically unsaturated polyhydric alcohol-polycarboxylic acid-alkyl phosphate polyester obtained as the reaction product of a polyhydric alcohol and an ethylenically unsaturated polycarboxylic acid wherein said polyester contains combined halogen selected from the group consisting of chlorine, bromine and iodine and mixtures thereof in an amount to yield from about 25% to about 35% by weight of said product and an alkyl phosphate wherein the alkyl group contains from 1 to 4 carbon atoms and is present in an amount to yield from about 0.5% to about 1.5% by weight of said product, (2) styrene and (3) from about 0.1% to about 1% by weight based on the total weight of 2-hydroxy-4-methoxy-benzophenone.

10. A method for producing a clear, flame-resistant self-extinguishing resinous composition which comprises preparing a polymerizable composition comprising (1) a polymerizable ethylenically unsaturated polyhydric alcohol-polycarboxylic acid-alkyl phosphate polyester obtained as the reaction product of a polyhydric alcohol and an ethylenically unsaturated polycarboxylic acid wherein said polyester contains combined halogen selected from the group consisting of chlorine, bromine and iodine and mixtures thereof in an amount to yield from about 5% to about 50% by weight of said product and an alkyl phosphate wherein the alkyl group contains from 1 to 4 carbon atoms and is present in an amount to yield from about 0.1% to about 5% by weight of said product and (2) a compound containing a polymerizable $CH_2=C<$ group and having a boiling point of at least 60° C. and contacting said polymerizable composition with a catalyst of the class consisting of organic peroxides and organic ozonides.

11. A method for producing a clear, flame-resistant self-extinguishing resinous composition which comprises preparing a polymerizable composition comprising (1) a polymerizable ethylenically unsaturated polyhydric alcohol-polycarboxylic acid-alkyl phosphate polyester obtained as the reaction product of a polyhydric alcohol and an ethylenically unsaturated polycarboxylic acid wherein said polyester contains combined halogen selected from the group consisting of chlorine, bromine and iodine and mixtures thereof in an amount to yield from about 5% to about 50% by weight of said product and an alkyl phosphate wherein the alkyl group contains from 1 to 4 carbon atoms and is present in an amount to yield from about 0.1% to about 5% by weight of said product and (2) a compound containing a polymerizable $CH_2=C<$ group and having a boiling point of at least 60° C.; adding thereto from about 0.01% to about 5% by weight based on the total weight of a compound having the general formula

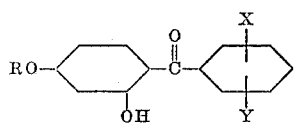

wherein R is an alkyl group having from 1 to 4 carbon atoms, X is a member selected from the group consisting of hydrogen, halo groups, alkyl groups having from 1 to 4 carbon atoms and alkoxy groups having from 1 to 4 carbon atoms and Y is a member selected from the group consisting of hydrogen, hydroxyl groups, halo groups, alkyl groups having from 1 to 4 carbon atoms and alkoxy groups having from 1 to 4 carbon atoms and contacting said polymerizable composition with a catalyst of the class consisting of organic peroxides and organic ozonides.

12. A method for producing a clear, flame-resistant self-extinguishing resinous composition which comprises preparing a polymerizable composition comprising (1) a polymerizable ethylenically unsaturated polyhydric alcohol-polycarboxylic acid-alkyl phosphate polyester obtained as the reaction product of a polyhydric alcohol and an ethylenically unsaturated polycarboxylic acid wherein said polyester contains combined halogen selected from the group consisting of chlorine, bromine and iodine and mixtures thereof in an amount to yield from about 5% to about 50% by weight of said product and an alkyl phosphate wherein the alkyl group contains from 1 to 4 carbon atoms and is present in an amount to yield from about 0.1% to about 5% by weight of said product and (2) a compound containing a polymerizable $CH_2=C<$ group and having a boiling point of at least 60° C., adding thereto from about 0.01% to about 5% by weight based on the total weight of 2-hydroxy-4-methoxybenzophenone and contacting said polymerizable composition with a catalyst of the class consisting of organic peroxides and organic ozonides.

13. A method for producing a clear, flame-resistant self-extinguishing resinous composition which comprises preparing a polymerizable composition comprising (1) a polymerizable ethylenically unsaturated polyhydric alcohol-polycarboxylic acid-alkyl phosphate polyester obtained as the reaction product of a polyhydric alcohol and an ethylenically unsaturated polycarboxylic acid wherein said polyester contains combined halogen selected from the group consisting of chlorine, bromine and iodine and mixtures thereof in an amount to yield from about 25% to about 35% by weight of said product and an alkyl phosphate wherein the alkyl group contains from 1 to 4 carbon atoms and is present in an amount to yield from about 0.5% to about 1.5% by weight of said product and (2) a compound containing a polymerizable $CH_2=C<$ group and having a boiling point of at least 60° C., and contacting said polymerizable composition with a catalyst of the class consisting of organic peroxides and organic ozonides.

14. A method for producing a clear, flame-resistant self-extinguishing resinous composition which comprises preparing a polymerizable composition comprising (1) a polymerizable ethylenically unsaturated polyhydric alcohol-polycarboxylic acid-alkyl phosphate polyester obtained as the reaction product of a polyhydric alcohol and an ethylenically unsaturated polycarboxylic acid wherein said polyester contains combined halogen selected from the group consisting of chlorine, bromine and iodine and mixtures thereof in an amount to yield from about 25% to about 35% by weight of said product and an alkyl phosphate wherein the alkyl group contains from 1 to 4 carbon atoms and is present in an amount to yield from about 0.5% to about 1.5% by weight of said product and (2) a compound containing a polymerizable $CH_2=C<$ group and having a boiling point of at least 60° C., adding thereto from about 0.1% to about 1% by weight based on the total weight of a compound having the general formula

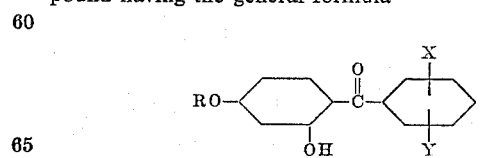

wherein R is an alkyl group having from 1 to 4 carbon atoms, X is a member selected from the group consisting of hydrogen, halo groups, alkyl groups having from 1 to 4 carbon atoms and alkoxy groups having from 1 to 4 carbon atoms and Y is a member selected from the group consisting of hydrogen, hydroxyl groups, halo groups, alkyl groups having from 1 to 4 carbon atoms and alkoxy groups having from 1 to 4 carbon atoms and contacting said polymerizable composition with a catalyst of the class consisting of organic peroxides and organic ozonides.

15. A method for producing a clear, flame-resistant self-extinguishing resinous composition which comprises preparing a polymerizable composition comprising (1) a polymerizable ethylenically unsaturated polyhydric alcohol-polycarboxylic acid-alkyl phosphate polyester obtained as the reaction product of a polyhydric alcohol and an ethylenically unsaturated polycarboxylic acid wherein said polyester contains combined halogen selected from the group consisting of chlorine, bromine and iodine and mixtures thereof in an amount to yield from about 25% to about 35% by weight of said product and an alkyl phosphate wherein the alkyl group contains from 1 to 4 carbon atoms and is present in an amount to yield from about 0.5% to about 1.5% by weight of said product and (2) a compound containing a polymerizable $CH_2=C<$ group and having a boiling point of at least 60° C., adding thereto from about 0.1% to about 1% by weight based on the total weight of 2-hydroxy-4-methoxybenzophenone and contacting said polymerizable composition with a catalyst of the class consisting of organic peroxides and organic ozonides.

16. A method for producing a clear, flame-resistant self-extinguishing resinous composition which comprises preparing a polymerizable composition comprising (1) a polymerizable ethylenically unsaturated polyhydric alcohol-polycarboxylic acid-alkyl phosphate polyester obtained as the reaction product of a polyhydric alcohol and an ethylenically unsaturated polycarboxylic acid wherein said polyester contains combined halogen selected from the group consisting of chlorine, bromine and iodine and mixtures thereof in an amount to yield from about 25% to about 35% by weight of said product and an alkyl phosphate wherein the alkyl group contains from 1 to 4 carbon atoms and is present in an amount to yield from about 0.5% to about 1.5% by weight of said product and (2) styrene and contacting said polymerizable composition with a catalyst of the class consisting of organic peroxides and organic ozonides.

17. A method for producing a clear, flame-resistant self-extinguishing resinous composition which comprises preparing a polymerizable composition comprising (1) a polymerizable ethylenically unsaturated polyhydric alcohol-polycarboxylic acid-alkyl phosphate polyester obtained as the reaction product of a polyhydric alcohol and an ethylenically unsaturated polycarboxylic acid wherein said polyester contains combined halogen selected from the group consisting of chlorine, bromine and iodine and mixtures thereof in an amount to yield from about 25% to about 35% by weight of said product and an alkyl phosphate wherein the alkyl group contains from 1 to 4 carbon atoms and is present in an amount to yield from about 0.5% to about 1.5% by weight of said product and (2) styrene, adding thereto from about 0.1% to about 1% by weight based on the total weight of a compound having the general formula

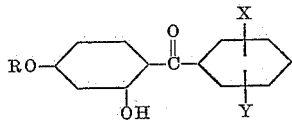

wherein R is an alkyl group having from 1 to 4 carbon atoms, X is a member selected from the group consisting of hydrogen, halo groups, alkyl groups having from 1 to 4 carbon atoms and alkoxy groups having from 1 to 4 carbon atoms and Y is a member selected from the group consisting of hydrogen, hydroxyl groups, halo groups, alkyl groups having from 1 to 4 carbon atoms and alkoxy groups having from 1 to 4 carbon atoms and contacting said polymerizable composition with a catalyst of the class consisting of organic peroxides and organic ozonides.

18. A method for producing a clear, flame-resistant self-extinguishing resinous composition which comprises preparing a polymerizable composition comprising (1) a polymerizable ethylenically unsaturated polyhydric alcohol-polycarboxylic acid-alkyl phosphate polyester obtained as the reaction product of a polyhydric alcohol and an ethylenically unsaturated polycarboxylic acid wherein said polyester contains combined halogen selected from the group consisting of chlorine, bromine and iodine and mixtures thereof in an amount to yield from about 25% to about 35% by weight of said product and an alkyl phosphate wherein the alkyl group contains from 1 to 4 carbon atoms and is present in an amount to yield from about 0.5% to about 1.5% by weight of said product and (2) styrene, adding thereto from about 0.1% to about 1% by weight based on the total weight of 2-hydroxy-4-methoxybenzophenone and contacting said polymerizable composition with a catalyst of the class consisting of organic peroxides and organic ozonides.

19. A clear, flame-resistant self-extinguishing resinous composition comprising the polymerizable mixture of (1) a polymerizable ethylenically unsaturated polyhydric alcohol-polycarboxylic acid-alkyl phosphate polyester obtained as the reaction product of a polyhydric alcohol and an ethylenically unsaturated polycarboxylic acid wherein said polyester contains combined halogen selected from the group consisting of chlorine, bromine and iodine and mixtures thereof in an amount to yield from about 5% to about 50% by weight of said product and an alkyl phosphate wherein the alkyl group contains from 1 to 4 carbon atoms and is present in an amount to yield from about 0.1% to about 5% by weight of said product and (2) a compound containing a polymerizable $CH_2=C<$ group and having a boiling point of at least 60° C., and a catalyst of the class consisting of organic peroxides and organic ozonides.

20. A clear, light-stable flame-resistant self-extinguishing resinous composition comprising the polymerizable mixture of (1) a polymerizable ethylenically unsaturated polyhydric alcohol-polycarboxylic acid-alkyl phosphate polyester obtained as the reaction product of a polyhydric alcohol and an ethylenically unsaturated polycarboxylic acid wherein said polyester contains combined halogen selected from the group consisting of chlorine, bromine and iodine and mixtures thereof in an amount to yield from about 5% to about 50% by weight of said product and an alkyl phosphate wherein the alkyl group contains from 1 to 4 carbon atoms and is present in an amount to yield from about 0.1% to about 5% by weight of said product, (2) a compound containing a polymerizable $CH_2=C<$ group and having a boiling point of at least 60° C., a catalyst of the class consisting of organic peroxides and organic ozonides for (1) and (2), and (3) from about 0.01% to about 5% by weight based on the total weight of a compound having the general formula

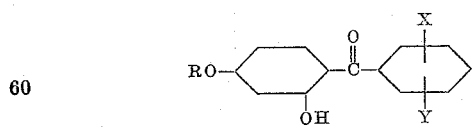

wherein R is an alkyl group having from 1 to 4 carbon atoms, X is a member selected from the group consisting of hydrogen, halo groups, alkyl groups having from 1 to 4 carbon atoms and alkoxy groups having from 1 to 4 carbon atoms and Y is a member selected from the group consisting of hydrogen, hydroxyl groups, halo groups, alkyl groups having from 1 to 4 carbon atoms and alkoxy groups having from 1 to 4 carbon atoms.

21. A clear, light-stable flame-resistant self-extinguishing resinous composition comprising the polymerizable mixture of (1) a polymerizable ethylenically unsaturated polyhydric alcohol-polycarboxylic acid-alkyl phosphate polyester obtained as the reaction product of a polyhydric alcohol and an ethylenically unsaturated polycarboxylic acid wherein said polyester contains combined hologen selected from the group consisting of chlorine, bromine and iodine and mixtures thereof in an amount to yield from about 5% to about 50% by weight of said product and an alkyl phosphate wherein the alkyl group contains from 1 to 4 carbon atoms and is present in an amount to yield from about 0.1% to about 5% by weight of said product, (2) a compound containing a polymerizable $CH_2=C<$ group and having a boiling point of at least 60° C., a catalyst of the class consisting of organic peroxides and organic ozonides for (1) and (2), and (3) from about 0.01% to about 5% by weight based on the total weight of 2-hydroxy-4-methoxybenzophenone.

22. A clear, flame-resistant self-extinguishing resinous composition comprising the polymerizable mixture of (1) a polymerizable ethylenically unsaturated polyhydric alcohol-polycarboxylic acid-alkyl phospate polyester obtained as the reaction product of a polyhydric alcohol and an ethylenically unsaturated polycarboxylic acid wherein said polyester contains combined halogen selected from the group consisting of chlorine, bromine and iodine and mixtures thereof in an amount to yield from about 25% to about 35% by weight of said product and an alkyl phosphate wherein the alkyl group contains from 1 to 4 carbon atoms and is present in an amount to yield from about 0.5% to about 1.5% by weight of said product and (2) a compound containing a polymerizable $CH_2=C<$ group and having a boiling point of at least 60° C., and a catalyst of the class consisting of organic peroxides and organic ozonides.

23. A clear, light-stable flame-resistant self-extinguishing resinous composition comprising the polymerizable mixture of (1) a polymerizable ethylenically unsaturated polyhydric alcohol-polycarboxylic acid-alkyl phosphate polyester obtained as the reaction product of a polyhydric alcohol and an ethylenically unsaturated polycarboxylic acid wherein said polyester contains combined halogen selected from the group consisting of chlorine, bromine and iodine and mixtures thereof in an amount to yield from about 25% to about 35% by weight of said product and an alkyl phosphate wherein the alkyl group contains from 1 to 4 carbon atoms and is present in an amount to yield from about 0.5% to about 1.5% by weight of said product, (2) a compound containing a polymerizable $CH_2=C<$ group and having a boiling point of at least 60° C., a catalyst of the class consisting of organic peroxides and organic ozonides for (1) and (2), and (3) from about 0.1% to about 1% by weight based on the total weight of a compound having the general formula

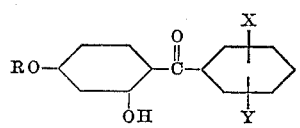

wherein R is an alkyl group having from 1 to 4 carbon atoms, X is a member selected from the group consisting of hydrogen, halo groups, alkyl groups having from 1 to 4 carbon atoms and alkoxy groups having from 1 to 4 carbon atoms and Y is a member selected from the group consisting of hydrogen, hydroxyl groups, halo groups, alkyl groups having from 1 to 4 carbon atoms and alkoxy groups having from 1 to 4 carbon atoms.

24. A clear, light-stable flame-resistant self-extinguishing resinous composition comprising the polymerizable mixture of (1) a polymerizable ethylenically unsaturated polyhydric alcohol-polycarboxylic acid-alkyl phosphate polyester obtained as the reaction product of a polyhydric alcohol and an ethylenically unsaturated polycarboxylic acid wherein said polyester contains combined halogen selected from the group consisting of chlorine, bromine and iodine and mixtures thereof in an amount to yield from about 25% to about 35% by weight of said product and an alkyl phosphate wherein the alkyl group contains from 1 to 4 carbon atoms and is present in an amount to yield from about 0.5% to about 1.5% by weight of said product, (2) a compound containing a polymerizable $CH_2=C<$ group and having a boiling point of at least 60° C., a catalyst of the class consisting of organic peroxides and organic ozonides for (1) and (2), and (3) from about 0.1% to about 1% by weight based on the total weight of 2-hydroxy-4-methoxybenzophenone.

25. A clear, flame-resistant self-extinguishing resinous composition comprising the polymerizable mixture of (1) a polymerizable ethylenically unsaturated polyhydric alcohol-polycarboxylic acid-alkyl phosphate polyester obtained as the reaction product of a polyhydric alcohol and an ethylenically unsaturated polycarboxylic acid wherein said polyester contains combined halogen selected from the group consisting of chlorine, bromine and iodine and mixtures thereof in an amount to yield from about 25% to about 35% by weight of said product and an alkyl phosphate wherein the alkyl group contains from 1 to 4 carbon atoms and is present in an amount to yield from about 0.5% to about 1.5% by weight of said product and (2) styrene, a catalyst of the class consisting of organic peroxides and organic ozonides.

26. A clear, light-stable flame-resistant self-extinguishing resinous composition comprising the polymerizable mixture of (1) a polymerizable ethylenically unsaturated polyhydric alcohol-polycarboxylic acid-alkyl phosphate polyester obtained as the reaction product of a polyhydric alcohol and an ethylenically unsaturated polycarboxylic acid wherein said polyester contains combined halogen selected from the group consisting of chlorine, bromine and iodine and mixtures thereof in an amount to yield from about 25% to about 35% by weight of said product and an alkyl phosphate wherein the alkyl group contains from 1 to 4 carbon atoms and is present in an amount to yield from about 0.5% to about 1.5% by weight of said product, (2) styrene, a catalyst of the class consisting of organic peroxides and organic ozonides for (1) and (2), and (3) from about 0.1% to about 1% by weight based on the total weight of a compound having the general formula

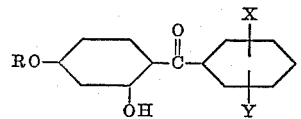

wherein R is an alkyl group having from 1 to 4 carbon atoms, X is a member selected from the group consisting of hydrogen, halo groups, alkyl groups having from 1 to 4 carbon atoms and alkoxy groups having from 1 to 4 carbon atoms and Y is a member selected from the group consisting of hydrogen, hydroxyl groups, halo groups, alkyl groups having from 1 to 4 carbon atoms and alkoxy groups having from 1 to 4 carbon atoms.

27. A clear, light-stable flame-resistant self-extinguishing resinous composition comprising the polymerizable mixture of (1) a polymerizable ethylenically unsaturated polyhydric alcohol-polycarboxylic acid-alkyl phosphate polyester obtained as the reaction product of a polyhydric alcohol and an ethylenically unsaturated polycarboxylic acid wherein said polyester contains combined halogen selected from the group consisting of chlorine, bromine and iodine and mixtures thereof in an amount to yield from about 25% to about 35% by weight of said product and an alkyl phosphate wherein the alkyl group contains from 1 to 4 carbon atoms and is present in an amount to yield from about 0.5% to about 1.5% by weight of said product, (2) styrene, a catalyst of the class consisting of organic peroxides and organic ozonides for (1) and (2), and (3) from about 0.1% to about 1% by weight based on the total weight of 2-hydroxy-4-methoxybenzophenone.

28. A polymerizable ethylenically unsaturated polyhydric alcohol-polycarboxylic acid-alkyl phosphate polyester obtained as the reaction product of a polyhydric alcohol and an ethylenically unsaturated polycarboxylic acid wherein said polyester contains combined halogen selected from the group consisting of chlorine, bromine and iodine and mixtures thereof in an amount to yield from about 5% to about 50% by weight of said product and an alkyl phosphate wherein the alkyl group contains from 1 to 4 carbon atoms and is present in an amount to yield from about 0.1% to about 5% by weight of said product.

29. A polymerizable ethylenically unsaturated polyhydric alcohol-polycarboxylic acid-alkyl phosphate polyester obtained as the reaction product of a polyhydric alcohol and an ethylenically unsaturated polycarboxylic acid wherein said polyester contains combined halogen selected from the group consisting of chlorine, bromine and iodine and mixtures thereof in an amount to yield from about 25% to about 35% by weight of said product and an alkyl phosphate wherein the alkyl group contains from 1 to 4 carbon atoms and is present in an amount to yield from about 0.5% to about 1.5% by weight of said product.

30. A polymerizable ethylenically unsaturated polyhydric alcohol-polycarboxylic acid-alkyl phosphate polyester obtained as the reaction product of a polyhydric alcohol with substantially equimolar proportions of a polycarboxylic acid selected from the group consisting of (a) ethylenically unsaturated polycarboxylic acid and (b) ethylenically unsaturated polycarboxylic acids and polycarboxylic acids free of non-benzenoid unsaturation wherein the ethylenically unsaturated polycarboxylic acid is present in a sufficient amount to yield an ethylenically unsaturated polymerizable product, said polyester containing combined halogen selected from the group consisting of chlorine, bromine and iodine and mixtures thereof in an amount to yield from about 5% to about 50% by weight of said product and an alkyl phosphate wherein the alkyl group contains from 1 to 4 carbon atoms in an amount to yield from about 0.1% to about 5% by weight of combined phosphorus in said product.

31. A polymerizable ethylenically unsaturated polyhydric alcohol-polycarboxylic acid-alkyl phosphate polyester obtained as the reaction product of a polyhydric alcohol with substantially equimolar proportions of a polycarboxylic acid selected from the group consisting of (a) ethylenically unsaturated polycarboxylic acid and (b) ethylenically unsaturated polycarboxylic acids and polycarboxylic acids free of non-benzenoid unsaturation wherein the ethylenically unsaturated polycarboxylic acid is present in a sufficient amount to yield an ethylenically unsaturated polymerizable product, said polyester containing combined halogen selected from the group consisting of chlorine, bromine and iodine and mixtures thereof in an amount to yield from about 25% to about 35% by weight of said product and an alkyl phosphate wherein the alkyl group contains from 1 to 4 carbon atoms in an amount to yield from about 0.5% to about 1.5% by weight of combined phosphorus in said product.

32. A polymerizable ethylenically unsaturated polyhydric alcohol polycarboxylic acid-alkyl phosphate polyester obtained as the reaction product of a polyhydric alcohol with substantially equimolar proportions of an ethylenically unsaturated polycarboxylic acid and hexachloroendomethylenetetrahydrophthalic acid wherein the ethylenically unsaturated polycarboxylic acid is present in a sufficient amount to yield an ethylenically unsaturated polymerizable product and the hexachloroendomethylenetetrahydrophthalic acid is present in an amount to yield from about 5% to about 50% by weight of said product of combined chlorine and an alkyl phosphate wherein the alkyl group contains from 1 to 4 carbon atoms in an amount to yield from about 0.1% to about 5% by weight of combined phosphorus in said product.

33. A polymerizable ethylenically unsaturated polyhydric alcohol polycarboxylic acid-alkyl phosphate polyester obtained as the reaction product of a polyhydric alcohol with substantially equimolar proportions of an ethylenically unsaturated polycarboxylic acid and hexachloroendomethylenetetrahydrophthalic acid wherein the ethylenically unsaturated polycarboxylic acid is present in a sufficient amount to yield an ethylenically unsaturated polymerizable product and the hexachloroendomethylenetetrahydrophthalic acid is present in an amount to yield from about 25% to about 35% by weight of said product of combined chlorine and an alkyl phosphate wherein the alkyl group contains from 1 to 4 carbon atoms in an amount to yield from about 0.5% to about 1.5% by weight of combined phosphorus in said product.

34. A polymerizable ethylenically unsaturated polyhydric alcohol polycarboxylic acid-alkyl phosphate polyester obtained as the reaction product of a polyhydric alcohol with substantially equimolar proportions of an ethylenically unsaturated polycarboxylic acid and hexachloroendomethylenetetrahydrophthalic acid wherein the ethylenically unsaturated polycarboxylic acid is present in a sufficient amount to yield an ethylenically unsaturated polymerizable product; and the hexachloroendomethylenetetrahydrophthalic acid is present in an amount to yield from about 5% to about 50% by weight of said product of combined chlorine and triethyl phosphate in an amount to yield from about 0.1% to about 5% by weight of combined phosphorus in said product.

35. A polymerizable ethylenically unsaturated polyhydric alcohol polycarboxylic acid-alkyl phosphate polyester obtained as the reaction product of a polyhydric alcohol with substantially equimolar proportions of an ethylenically unsaturated polycarboxylic acid and hexachloroendomethylenetetrahydrophthalic acid wheerin the ethylenically unsaturated polycarboxylic acid is present in a sufficient amount to yield an ethylenically unsaturated polymerizable product and the hexachloroendomethylenetetrahydrophthalic acid is present in an amount to yield from about 25% to about 35% by weight of said product of combined chlorine and triethyl phosphate in an amount to yield from about 0.5% to about 1.5% by weight of combined phosphorus in said product.

36. A process for preparing a clear, flame-resistant self-extinguishing polymerizable ethylenically unsaturated polyester resinous composition which comprises reacting (A) substantially equal molar proportions of (1) a polycarboxylic acid selected from the group consisting of (a) ethylenically unsaturated polycarboxylic acids and (b) ethylenically unsaturated polycarboxylic acids and polycarboxylic acids free of non-benzenoid unsaturation wherein the ethylenically unsaturated polycarboxylic acid is present in a sufficient amount to yield an ethylenically unsaturated polymerizable product, (2) a polyhydric alcohol, said polyester containing combined halogen selected from the group consisting of chlorine, bromine and iodine and mixtures thereof in an amount to yield from about 5% to about 50% by weight of said product and (B) an alkyl phosphate wherein the alkyl group contains from 1 to 4 carbon atoms in an amount to yield from about 0.1% to about 5% by weight of combined phosphorus in said composition.

37. A process for preparing a clear, flame-resistant self-extinguishing polymerizable ethylenically unsaturated polyester resinous composition which comprises reacting (A) substantially equal molar proportions of (1) a polycarboxylic acid selected from the group consisting of (a) ethylenically unsaturated polycarboxylic acids and (b) ethylenically unsaturated polycarboxylic acids and polycarboxylic acids free of non-benzenoid unsaturation wherein the ethylenically unsaturated polycarboxylic acid is present in a sufficient amount to yield an ethylenically unsaturated polymerizable product, (2) a polyhydric alcohol, said polyester containing combined halogen selected from the group consisting of chlorine, bromine and iodine and mixtures thereof in an amount to yield from about 25% to about 35% by weight of said product and (B) an aklyl phosphate wherein the alkyl group contains from 1 to 4 carbon atoms in an amount to yield from about 0.5% to about 1.5% by weight of combined phosphorus in said composition.

References Cited in the file of this patent

UNITED STATES PATENTS

| | | |
|---|---|---|
| 2,304,466 | Matheson et al. | Dec. 8, 1942 |
| 2,443,736 | Kropa | June 22, 1948 |
| 2,537,520 | Eger | Jan. 9, 1951 |
| 2,543,635 | Loritsch | Feb. 27, 1951 |
| 2,568,894 | Mackey | Sept. 25, 1951 |
| 2,635,089 | Anderson | Apr. 14, 1953 |
| 2,646,416 | Parker | July 21, 1953 |

OTHER REFERENCES

Hodgman: Handbook of Chemistry and Physics, 34th edition (1952–1953), pages 347 and 349.

UNITED STATES PATENT OFFICE

CERTIFICATE OF CORRECTION

Patent No. 2,819,247 January 7, 1958

Lennart A. Lundberg

It is hereby certified that error appears in the above numbered patent requiring correction and that the said Letters Patent should read as corrected below.

In the heading to the printed specification, line 4, for "PHOSPORUS" read -- PHOSPHORUS --; column 1, line 62, before "halogen group" insert -- a --; column 8, line 35, for "or ethylene" read -- of ethylene --; column 15, line 4, for "hologen" read -- halogen --.

Signed and sealed this 8th day of April 1958.

(SEAL)
Attest:
KARL H. AXLINE
Attesting Officer

ROBERT C. WATSON
Commissioner of Patents